United States Patent [19]
Carter, III.

[11] Patent Number: 5,120,200
[45] Date of Patent: Jun. 9, 1992

[54] HYDRAULIC DRIVE ASSEMBLY

[76] Inventor: James A. Carter, III., P.O. Box 15741, Baton Rouge, La. 70809

[21] Appl. No.: 653,063

[22] Filed: Feb. 11, 1991

[51] Int. Cl.$^5$ .................. F04B 49/00; F04B 41/00; F16D 57/00
[52] U.S. Cl. .................. 417/295; 417/236; 417/441; 188/290
[58] Field of Search .................. 417/295, 236, 441; 188/290; 242/75.5; 226/24, 38, 42

[56] References Cited

U.S. PATENT DOCUMENTS

| | | | |
|---|---|---|---|
| 2,901,192 | 8/1953 | Nystrand | 242/75.5 |
| 3,426,687 | 2/1969 | Murray | 417/441 |
| 3,568,821 | 3/1971 | Gronkvist | 198/127 |
| 3,771,919 | 4/1973 | Wright et al. | 417/236 |
| 3,974,910 | 8/1976 | Papai | 198/203 |
| 4,013,166 | 3/1977 | Weady et al. | 198/835 |
| 4,265,386 | 5/1981 | Levy et al. | 226/190 |
| 4,832,656 | 5/1989 | Rado | 464/40 |
| 4,908,905 | 3/1990 | Kanno et al. | 188/290 |
| 4,934,123 | 6/1990 | Salzsauler | 53/399 |

*Primary Examiner*—Richard A. Bertsch
*Assistant Examiner*—Alfred Basichas
*Attorney, Agent, or Firm*—David L. Ray

[57] ABSTRACT

In accordance with the present invention there is provided a hydraulic drive assembly including a driven member having a hydraulic pump located therein for selectively circulating liquids within the driven member, a drive shaft connected to the driven member for turning the drive shaft of the hydraulic pump, and a control member for selectively varying the flow of fluids from the pump.

6 Claims, 4 Drawing Sheets

HYDRAULIC DRIVE ASSEMBLY

BACKGROUND OF THE INVENTION

1. Field of the Invention

The present invention is related to a hydraulic drive or clutch assembly. More particularly, the present invention is related to a hydraulic drive or clutch for a stretch conveyor roller. Even more particularly, the present invention is related to a drive or clutch for a conveyor roller for stretching film.

2. Description of the Prior Art

Mechanisms and assemblies for driving conveyor rollers and hydraulic drive assemblies are well known in the art. Exemplary of the prior art are the following U.S. Patents:

U.S. Pat. No. 3,568,821 discloses a power-driven conveyor roller. The roller is the type used in conveyor roller trains. The conveyor roller includes a drum with an enclosed power unit. One end of the drum is journaled in a frame, the other end is journaled on the power unit which projects out from the drum and is fixedly mounted in the frame. The power unit includes a pressure fluid driven sliding vane motor which has two alternative inlets, one of the inlets being used to effect rotation in one direction and the other being used to effect rotation in the opposite direction. Conveniently, the two inlets are provided with variable restrictions, so as to permit some adjustment of the maximum speed by means of the restrictions.

U.S. Pat. No. 3,974,910 discloses a fluid cylinder decelerating means. A piston and cylinder actuator is disclosed embodying means to control the acceleration and deceleration of the piston as it approaches the end of its stroke. Such actuator is also disclosed as an intermittent drive for a machine system in which at least part of the drive connection is provided by a friction drive. The acceleration and deceleration control is arranged to prevent slippage in the drive. The acceleration and deceleration control includes a land positioned on each side of the piston, each formed with a plurality of axially spaced orifices. As the piston approaches one end of its stroke, one land projects through an associated seal which operates to progressively isolate the orifices from the main chamber to control deceleration. Such orifices are progressively uncovered as the piston moves away from its end position, and in one embodiment provides controlled acceleration. The other land functions in a similar manner to control piston acceleration and deceleration at the other end of the piston stroke. One of the lands is provided by a tubular element positioned around the piston rod and proportioned so that it does not significantly change the effective area of the piston as the land comes into or goes out of operation. The lands are proportioned to provide the same deceleration rates at each end of the piston stroke. In a second embodiment, a separate adjustable flow restriction is provided to control acceleration of the piston without materially affecting its deceleration.

U.S. Pat. No. 4,013,166 discloses a hydraulic driven pulley for conveyors whereby a hydraulic motor encased with a pulley drives the pulley and thereby drives a belt conveyor. The motor is encased in a stationary housing and is driven by fluid pumped from an external source through a stationary first shaft into the interior of the pulley. The first shaft and a second stationary shaft are supported by brackets which sustain the weight of the assembly. The pulley revolves on bearings on two shafts. The inner end of the first shaft is supported by one end of the motor housing and the inner end of the second shaft by bearings in a drive flange which is fixed to the motor shaft and to an internal partition of the pulley. The partition is apertured and communicates with a discharge duct in the second shaft so that fluid leaking in the interior of the pulley is discharged.

U.S. Pat. No. 4,265,386 discloses a torsional fluid damper system including methods and apparatus for providing torsional fluid dampening in the kHz region with an inertial mass located in a rotary fluid container, and with a viscous fluid friction boundary layer located between that mass and a circumferential wall of the container. A supply of viscous liquid having a volume equal to the combined volumes of the boundary layer and inertial mass is provided. Both the inertial mass and the boundary layer are formed with that supply of viscous liquid in the fluid container which may then be rotated.

U.S. Pat. No. 4,832,656 discloses a power roll conveyer with an adjustable torque sensitive coupling including a powered conveyor roller having a frictional coupling inside the roller drivingly connecting the roller to a drive shaft extending actually through the roller. The coupling includes a flat spring wrapped around the shaft to form a frictional engagement with a pair of split bushings disposed of the shaft and inside the spring, the opposite end of the spring being connected to the roller in such a manner that the roller is driven by the shaft up to a predetermined load on the roller but the shaft and roller rotate with respect to one another when the load exceeds a predetermined, adjusted level.

U.S. Pat. No. 4,934,123 discloses a method and apparatus for dispensing a web of material including at least one roller adapted to engage the web, a structure for rotationally driving the roller when the web is drawn from the roller at a preselected force, and a planetary gear assembly associated with the driving structure for varying the rate of rotationally driving the roller in response to variation in the force drawing the web from the roller so as to maintain the drawing force at the preselected level.

SUMMARY OF THE INVENTION

In accordance with the present invention there is provided a hydraulic drive assembly including a driven member having a hydraulic pump located therein for selectively circulating liquids within the driven member, a drive shaft connected to the driven member for turning the drive shaft of the hydraulic pump, and a control member for selectively varying the flow of fluids from the pump.

In one embodiment of the present invention there is provided a hydraulic drive assembly unit including a roller for rotating about an axis, a pump located inside the roller for circulating fluids contained inside the roller, the pump having an output shaft rigidly connected to the roller, the pump having an intake port and an outlet port, a drive shaft connected to the pump for rotating the pump, and a throttle for selectively restricting the amount of fluid flowing through the outlet or inlet port.

In another embodiment of the present invention there is provided a hydraulic drive assembly unit including a roller for rotating about an axis, a pump located inside the roller for circulating fluids contained inside the roller, the pump housing being rigidly connected to the roller, the pump having an intake port and an outlet port, a drive shaft connected to the pump for driving the pump, and a throttle for selectively restricting the amount of fluid flowing through the outlet or inlet port.

The hydraulic drive assembly of the invention controls the rotational speed of a roller by controlling the flow of fluid through a fluid pump located in the roller which is recycling fluid, preferably oil, within the roller. The rotational speed of the roller driven by the hydraulic drive assembly of the present invention can be controlled quickly and with great precision. Also, very low forces are required to control the speed of the roller.

The flow of oil is controlled by a valve on the suction or intake or discharge of the pump. If no rotation of the roller containing the pump is desired, the valve is fully opened. To increase the rotational speed of the roller, the valve is partially closed thus restricting flow through the pump and causing the pump to rotate since the pump is rigidly connected to the roller. The rotational speed of the roller is variable from no rotation up to the rotational speed of the drive shaft when flow through the pump is completely restricted.

The present invention has the further advantage of being low in cost to manufacture and being easy to maintain. Very few moving parts are required and the assembly incurs very little wear in operation.

DESCRIPTION OF THE PREFERRED EMBODIMENTS

Figure 1:
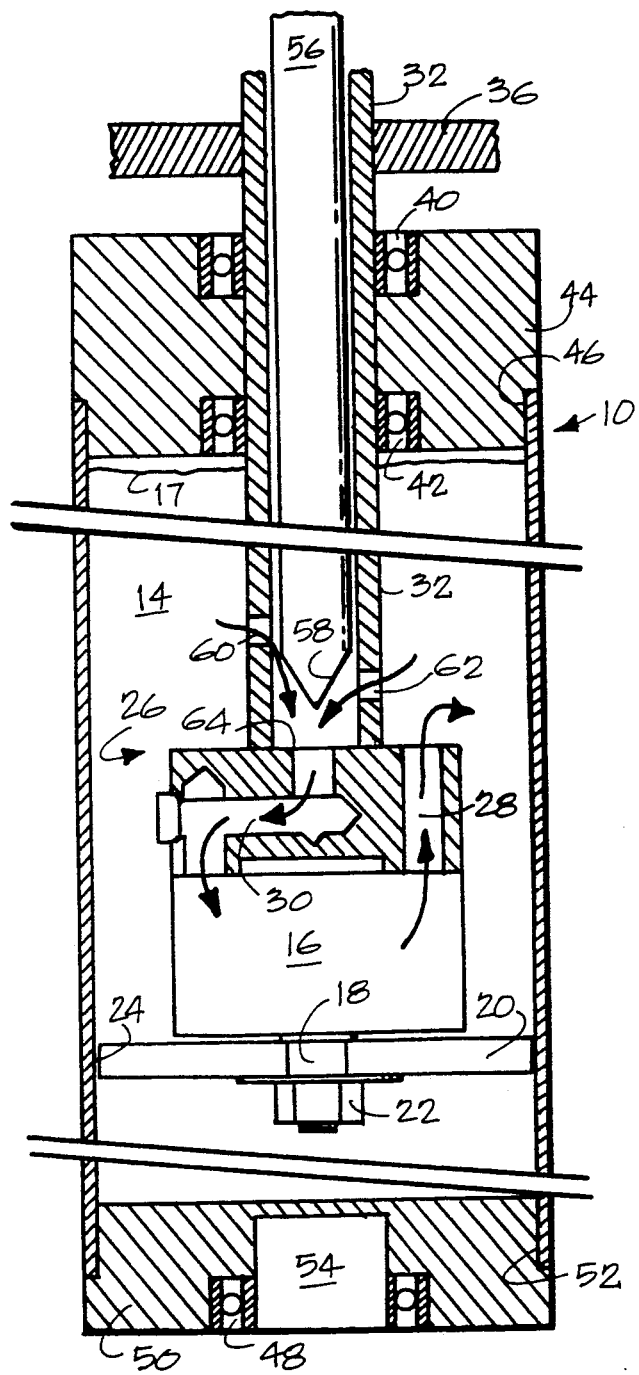
FIG. 1 is a schematic, partly cross-sectional view of a roller containing a first embodiment of the hydraulic drive assembly of the present invention.

Referring now to the drawings, in FIG. 1 is shown a first embodiment of the hydraulic drive assembly of the invention. A conveyor roller is generally indicated by the numeral 10. Conveyor roller 10 includes a drum 12 having a hollow chamber 14 therein.

A fluid pump 16 is located in hollow chamber 14. Pump 16 is a conventional positive displacement pump. Such positive displacement pumps include conventional gear pumps, and conventional pumps based on the gerotor principle in which the inner rotor has one less tooth than the outer rotor, and as the inner rotor revolves, liquid is drawn into the enlarging chamber to a maximum volume equal to that of the missing tooth on the inner element, and the liquid is forced out as the teeth mesh, decreasing the chamber volume.

Preferably, the fluid circulate by pump 16 within hollow chamber 14 is a liquid having a liquid level 17 shown in FIG. 1. Preferably, the liquid is an oil. Although air or other gases might be used in some applications, gases are not preferred because they are compressible.

Pump 16 has a rotating shaft 18 connected thereto which is normally used to drive a conventional positive displacement pump. Rotating shaft 18 is rigidly connected to circular disc 20 by nut 22. Disc 22 is rigidly connected at the periphery 24 thereof to drum 12.

Rigidly connected to pump 16 is the fitting generally indicated by the numeral 26. Manifold 26 is rigidly connected to pump 16 in any conventional manner such as bolting, screwing, welding, or the like.

Fitting 26 has an outlet passage 28 and an inlet passage 30. Inlet passage 30 conveys fluids such as oil contained in hollow chamber 14 to pump 16 which pumps the fluid from inlet passage 30 into hollow chamber 14 from outlet passage 28.

Hollow drive shaft 32 is rigidly connected to fitting 26 by bolting, screwing, welding, or the like. Hollow drive shaft 32 has sprocket 36 rigidly connected thereto. Hollow drive shaft 32 is rotatably connected to motor 34 shown in FIG. 2 by sprocket 36 driven by chain 38. Motor 34 is preferably a conventional electric motor, although other types of motor such as an internal combustion engine could be used if desired.

The end of hollow drive shaft 32 to which sprocket 36 is attached could be rotatably connected to a support member such as a metal frame or plate (not shown) to provide additional support to the sprocket end of hollow shaft 32 and conveyor roller 10. Hollow drive shaft 32 could be received in a ball bearing or roller bearing (not shown) contained in the plate or frame (not shown).

Hollow drive shaft 32 is rotatably connected to drum 20 by bearings 40 and 42. Bearings 40 and 42 are connected to first drum cap 44 which is rigidly connected to drum 12 at seam 46 by welding, gluing, force fitting, screwing or the like. Bearings 48 are connected to second drum cap 50 which is rigidly connected to drum 12 at seam 52. Second drum cap 50 has a cylindrical cavity 54 for receipt of a rigid post (not shown) about which the drum 12 can rotate. If desired, hollow drive shaft 32 could be located inside of a hollow shaft (not shown) rigidly connected to first drum cap 44 to provide additional stability to drum 12.

A solid control rod 56 having preferably a tapered, conical point 58 is slidably received in hollow shaft 32. Hollow shaft 32 has an upper port 60 and a lower port 62 therein through which fluid from hollow chamber 14 can be drawn by pump 16. Fitting 26 has a seat 64 against which point 58 can be forced to stop all fluid intake to pump 16.

To cause drum 12 and conveyor roller 10 to turn at the same speed as rotating shaft 32, solid control rod 56 is forced against seat 64 to stop all fluid intake to pump 16. To decrease the rate of rotation of drum 12, rod 56 is moved up away from seat 64 to open port 62. To force drum 12 to turn at a still slower speed than rod 56, rod 56 is moved upwardly until fluids flow through port 60 to and through seat 64 and into inlet passage 30. When sufficient intake ports have been opened by moving rod 56 upwardly to allow full flow through pump 16, drum 10 will stop turning.

Figure 2:
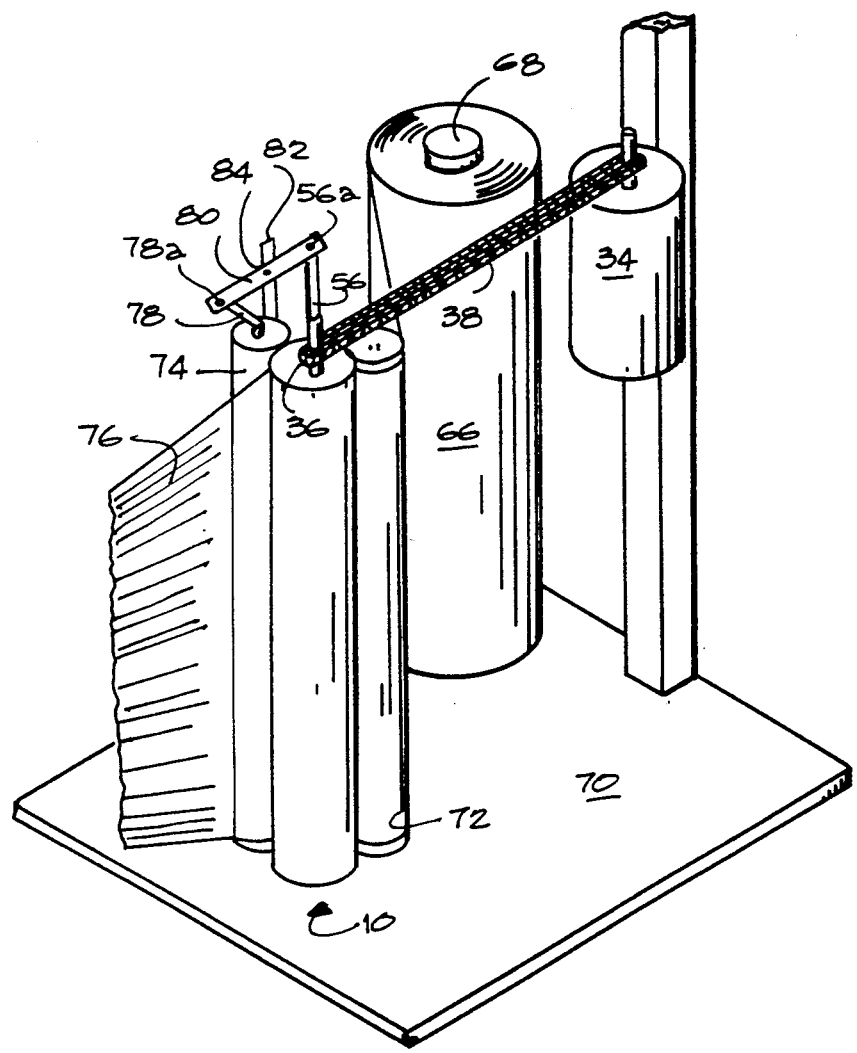
FIG. 2 is a schematic, perspective view of the roller shown in FIG. 1 used to stretch film.

In FIG. 2, the conveyor 10 of the invention is shown being utilized to stretch plastic film. The film stock 66 is mounted vertically on roller 68 which is rotatably connected to base 70. Located adjacent to conveyer 10 is stretch roller 72.

The film stock 66 is stretched by conveyor 10 pulling film stock 66 over stretch roller 72 which has an adjustable drag, or resistance to rotational motion, which causes the film stock 66 to stretch a desired amount prior to wrapping goods with the film. Commonly boxed goods loaded on a pallet for shipping are wrapped with such stretched film.

Also located adjacent to conveyor 10 is dance bar 74, which can be moved laterally away from conveyor 10 by the operator pulling on film sheet 76 with his hand. When dancer bar 74 is moved laterally, movable rod 78 movably attached to dancer bar 74 forces the end of lever arm 80 to which rod 78 is attached upwardly, thereby forcing rod 56 downward to increase the rotational speed of drum 12.

As can be seen in the drawing, lever arm 80 is connected to stationary support rod 82 by pivot pin 84. Rod 78 is rotatably pinned to rod 80 at 78a and control rod 56 is rotatably to rod 80 at 56a.

The hydraulic drive assembly of the invention can be seen above to control the rotational speed of roller 10 by controlling the flow of fluid through fluid pump 16 located in roller 10 which is recycling fluid, preferably oil, within roller 10 when drive shaft 32 is being turned at a constant speed. The rotational speed of roller 10 is varied by moving control rod 56 to increase or restrict the flow of oil to pump 16.

If no rotation of the roller 10 containing the fluid pump 16 is desired, solid control rod 56 is drawn away from seat 64 and ports 60 and 62 until both ports 60 and 62, and seat 64, are fully opened and unrestricted by control rod 56. To increase the rotational speed of roller 10, control rod 56 is moved toward seat 64 to partially close port 60 and/or 62, thus restricting flow through pump 16 and causing pump 16 and roller 10 to rotate since pump 16 is rigidly connected to roller 10. The rotational speed of roller 10 is variable from no rotation up to the rotational speed of drive shaft 32 when flow through the pump 16 is completely restricted.

Figure 3:
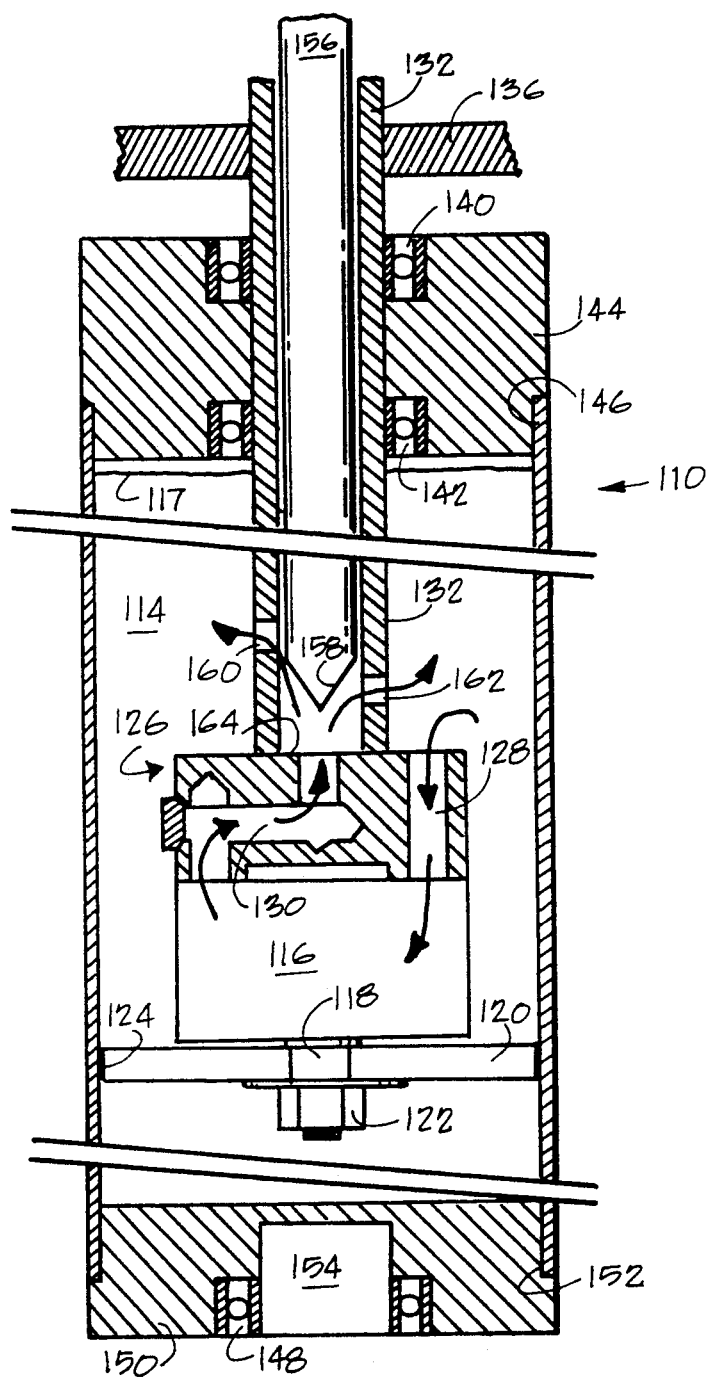
FIG. 3 is a schematic, partly cross-sectional view of a roller containing a second embodiment of the hydraulic drive assembly of the present invention.

Referring now to FIG. 3, a second embodiment of the hydraulic drive assembly of the invention is shown. A conveyor roller is generally indicated by the numeral 110. Conveyor roller 110 includes a drum 112 having a hollow chamber 114 therein.

A fluid pump 116 is located in hollow chamber 114. Pump 116 is a conventional positive displacement pump. Such positive displacement pumps include conventional gear pumps, and conventional pumps based on the gerotor principle in which the inner rotor has one less tooth than the outer rotor, and as the inner rotor revolves, liquid is drawn into the enlarging chamber to a maximum volume equal to that of the missing tooth on the inner element, and the liquid is forced out as the teeth mesh, decreasing the chamber volume.

Preferably, the fluid circulated by pump 116 within hollow chamber 114 is a liquid having a liquid level 117 shown in FIG. 3. Preferably, the liquid is an oil. Although air or other gases might be used in some applications, gases are not preferred because they are compressible.

Pump 116 has a rotating shaft 118 connected thereto which is normally used to drive a conventional positive displacement pump. Rotating shaft 118 is rigidly connected to circular disc 120 by nut 122. Disc 122 is rigidly connected at the periphery 124 thereof to drum 112.

Rigidly connected to pump 116 is the fitting generally indicated by the numeral 126. Fitting 126 is rigidly connected to pump 116 in any conventional manner such as bolting, screwing, welding, or the like.

Fitting 126 has an inlet passage 128 and an inlet passage 130. Inlet passage 128 conveys fluids such as oil contained in hollow chamber 114 to pump 116 which pumps the fluid from inlet passage 128 to outlet passage 130.

Hollow drive shaft 132 is rigidly connected to fitting 126 by bolting, screwing, welding, or the like. Hollow drive shaft 132 has sprocket 136 rigidly connected thereto. Hollow drive shaft 132 and sprocket 136 may be rotatably connected to motor 134 in the same manner as hollow drive shaft 32 and sprocket 36 is connected to motor 34 as shown in FIG. 2 by chain 38. Motor 34 is preferably a conventional electric motor, although other types of motor such as an internal combustion engine could be used if desired.

The end of hollow drive shaft 132 to which sprocket 136 is attached could be rotatably connected to a support member such as a metal frame or plate (not shown) to provide additional support to the sprocket end of hollow drive shaft 132 and roller 110. Hollow drive shaft 132 could be received in a ball bearing or roller bearing (not shown) contained in the plate or frame (not shown).

Hollow drive shaft 132 is rotatably connected to drum 112 by bearings 140 and 142. Bearings 140 and 142 are connected to first drum cap 144 which is rigidly connected to drum 112 at seam 146 by welding, gluing, force fitting, screwing or the like. Bearings 148 are connected to second drum cap 150 which is rigidly connected to drum 112 at seam 152. Second drum cap 150 has a cylindrical cavity 154 for receipt of a rigid post (not shown) about which the drum 112 can rotate. If desired, hollow drive shaft 132 could be located inside of a hollow shaft (not shown) rigidly connected to first drum cap 144 to provide additional stability to drum 112.

A solid control rod 156 having preferably a tapered, conical point 158 is slidably received in hollow shaft 132. Hollow shaft 132 has an upper port 160 and a lower port 162 therein through which fluid from outlet passage 130 can flow. Fitting 126 has a seat 164 against which point 158 can be forced to stop all fluid intake to pump 116.

To cause drum 112 and conveyor roller 110 to turn at the same speed as rotating shaft 132, solid control rod 156 is forced against seat 164 to stop all fluid flow from pump 116. To decrease the rate of rotation of drum 112, rod 156 is moved up away from seat 164 to open port 162. To force drum 112 to turn at a still slower speed than rod 156, rod 156 is moved upwardly until fluids flow from outlet passage 130 to and through seat 164 and outwardly through upper port 160. When sufficient outlet ports have been opened by moving rod 156 upwardly to allow full flow through pump 116, drum 110 will stop turning.

Figure 4:
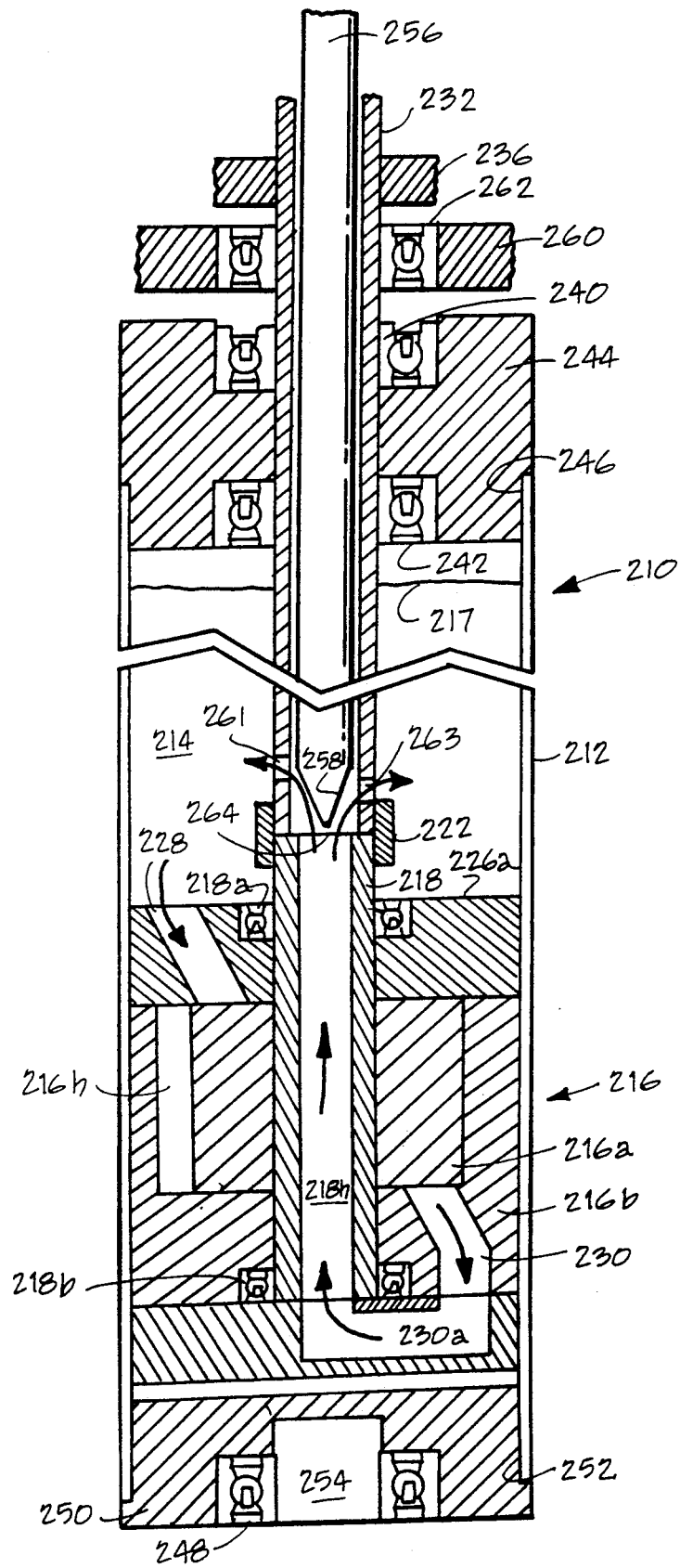
FIG. 4 is a schematic, partly cross-sectional view of a roller containing a third embodiment of the hydraulic drive assembly of the present invention.

Referring now to FIG. 4, a third embodiment of the hydraulic drive assembly of the invention is shown. A conveyor roller is generally indicated by the numeral 210. Conveyor roller 210 includes a drum 212 having a hollow chamber 214 therein.

A fluid pump generally indicated by the numeral 216 is located in drum 212 adjacent to hollow chamber 214. Pump 216 is a conventional positive displacement pump. Such positive displacement pumps include conventional gear pumps, and conventional pumps based on the gerotor principle in which the inner rotor has one less tooth than the outer rotor, and as the inner rotor revolves, liquid is drawn into the enlarging chamber to a maximum volume equal to that of the missing tooth on the inner element, and the liquid is forced out as the teeth mesh, decreasing the chamber volume.

Pump 216 has an inner rotor 216a which is rigidly connected to hollow rotating shaft 218. Inner rotor 216a rotates in an outer rotor chamber 216h located in the rotor housing 216b. Rotor housing 216b has outlet port 230 therein for receiving fluid flowing from rotor chamber 216h.

Rotating shaft 218 rotates in bearings 218a and 218b. Bearing 218a is connected to first fitting 226a and bearing 218b are connected to rotor housing 216b. First fitting manifold 226a is rigidly connected to rotor housing 216b, and rotor housing 216b is rigidly connected to drum 212 by any conventional method such as welding, bolting, screwing, or the like.

Located beneath rotor housing 216b is second fitting 226b, which is rigidly connected to rotor housing 216b. Second fitting 226b has outlet passage 230a for conveying fluid from outlet passage 230 to the hollow channel 218h in rotating shaft 218.

Preferably, the fluid circulated by pump 216 within hollow chamber 214 is a liquid having a liquid level 217 shown in FIG. 4. Preferably, the liquid is an oil. Although air or other gases might be used in some applications, gases are not preferred because they are compressible.

Pump 216 has rotating shaft 218 connected thereto which is normally used to drive a conventional positive displacement pump. Rotating shaft 218 is rigidly connected to hollow drive shaft 232 by coupling 222. Coupling 222 can be attached to hollow drive shaft 232 and rotating shaft 218 by any conventional method such as threading, welding, bolting, screwing, or the like.

Fitting 226 has an inlet passage 228. Inlet passage 228 conveys fluids such as oil contained in hollow chamber 214 to pump 216 which pumps the fluid from inlet passage 228 to outlet passage 230 as indicated by the arrows.

Hollow drive shaft 232 has sprocket 236 rigidly connected thereto. Hollow drive shaft 232 and sprocket 236 may be rotatably connected to motor 134 in the same manner as hollow drive shaft 32 and sprocket 36 is connected to motor 34 as shown in FIG. 2 by chain 38. Motor 34 is preferably a conventional electric motor, although other types of motor such as an internal combustion engine could be used if desired.

The end of hollow drive shaft 232 to which sprocket 236 is attached could be rotatably connected to a support member such as a metal frame or plate 260 shown in FIG. 4 to provide additional support to the sprocket end of hollow shaft 232 and conveyor roller 210. Hollow drive shaft 232 could be received in a ball bearing or roller bearing 262 contained in the plate or frame 260.

Hollow drive shaft 232 is rotatably connected to drum 212 by bearings 240 and 242. Bearings 240 and 242 are connected to first drum cap 244 which is rigidly connected to drum 212 at seam 246 by welding, gluing, force fitting, screwing or the like. Bearing 248 is connected to second drum cap 250 which is rigidly connected to drum 212 at seam 252. Second drum cap 250 has a cylindrical cavity 254 for receipt of a rigid post (not shown) about which the drum 212 can rotate. If desired, hollow drive shaft 232 could be located inside of a hollow shaft (not shown) rigidly connected to first drum cap 244 to provide additional stability to drum 212.

A solid control rod 256 having preferably a tapered, conical point 258 is slidably received in hollow drive shaft 232. Hollow drive shaft 232 has an upper port 261 and a lower port 263 therein through which fluid from outlet passage 230 can flow. Rotating shaft 218 has a seat 264 against which tapered point 258 can be forced to stop all fluid discharge from pump 216.

To cause drum 212 and conveyor roller 210 to turn at the same speed as rotating shaft 232, solid control rod 256 is forced against seat 264 to stop all fluid flow from pump 216. To decrease the rate of rotation of drum 212, rod 256 is moved up away from seat 264 to open port 263. To force drum 212 to turn at a still slower speed than rod 256, rod 256 is moved upwardly until fluids flow from outlet passage 230 to and through seat 264 and outwardly through upper port 261 and port 263. When sufficient outlet ports have been opened by moving rod 256 upwardly to allow full flow through pump 216, drum 210 will stop turning.

The hydraulic drive assembly can be used to drive devices other than a conveyor roller and is not limited thereto. Other devices which could be driven by the hydraulic drive assembly of the invention include a roller conveyor zone control, or any device which is rotated. Furthermore, the present invention can be used as a braking device for rotational equipment, in anti-skid braking systems, as a power transmission for power driven machinery including vehicles such as motorcycles, powered carts, and the like.

Although the preferred embodiments of the present invention have been disclosed and described in detail above, it should be understood that the invention is in no sense limited thereby, and its scope is to be determined by that of the following claims:

What is claimed is:

1. A hydraulic drive assembly comprising:
   a. driven means for rotating about an axis;
   b. pump means located inside said driven means for pumping fluids contained inside said driven means, said pump means having an output shaft rigidly connected to said driven means, said pump means having an intake port and an outlet port,
   c. a rigid rotatable shaft connected to motor means for rotating said shaft and to said pump means for rotating said pump means, said rigid rotatable shaft being hollow and having a plurality of passage means therein through which fluid can flow from the interior of said rotatable shaft to the exterior of said rotatable shaft, and
   d. control means for selectively restricting the amount of fluid flowing through said inlet port or said outlet port.

2. The hydraulic drive assembly of claim 1 wherein said outlet port is connected to the hollow portion of said rigid rotatable shaft and discharges fluid pumped from said pump means into said hollow portion of said rigid rotatable shaft.

3. The hydraulic drive assembly of claim 2 wherein said control means includes a rod means slidably received in the hollow portion of said rigid rotatable shaft for restricting the flow of said fluid pumped from said pump means into said hollow portion of said rigid rotatable shaft.

4. The hydraulic drive assembly of claim 3 wherein fitting means is connected to said pump means and said rigid rotatable shaft for conveying fluids discharged by said pump to said rigid rotatable shaft and for conveying fluid from the interior of said driven means to said pump means.

5. A method for selectively stopping and driving a roller comprising:

a. connecting a fluid pump to the interior of a roller, said pump having a fluid inlet through which fluids enter said fluid pump and a fluid outlet through which fluids are pumped and exit said fluid pump, said fluid pump having a rotatable driven shaft for driving the pump to pump fluids, b. connecting said rotatable driven shaft rigidly to said roller, c. filling the interior of the roller with liquid and opening said fluid inlet and said fluid outlet to said interior of said roller, d. rotating the fluid pump, and e. restricting the flow of fluid from said fluid outlet to increase the rotational speed of said roller.

6. A method for selectively stopping and driving a roller comprising:

a. connecting a fluid pump to the interior of a roller, said pump having a fluid inlet through which fluids enter said fluid pump and a fluid outlet through which fluids are pumped and exit said fluid pump, said fluid pump having a rotatable driven shaft for driving the pump to pump fluids, b. connecting said rotatable driven shaft rigidly to said roller, c. filling the interior of the roller with liquid and opening said fluid inlet and said fluid outlet to said interior of said roller, d. rotating the fluid pump, and e. restricting the flow of fluid to said fluid inlet to increase the rotational speed of said roller.

* * * * *